March 17, 1970

JAMES E. WEBB
ADMINISTRATOR OF THE NATIONAL AERONAUTICS
AND SPACE ADMINISTRATION
PARALLEL PLATE VISCOMETER 3,500,677

Filed Aug. 7, 1967

INVENTORS:
Harold H. Broyles
Howard F. Broyles

ATTORNEYS

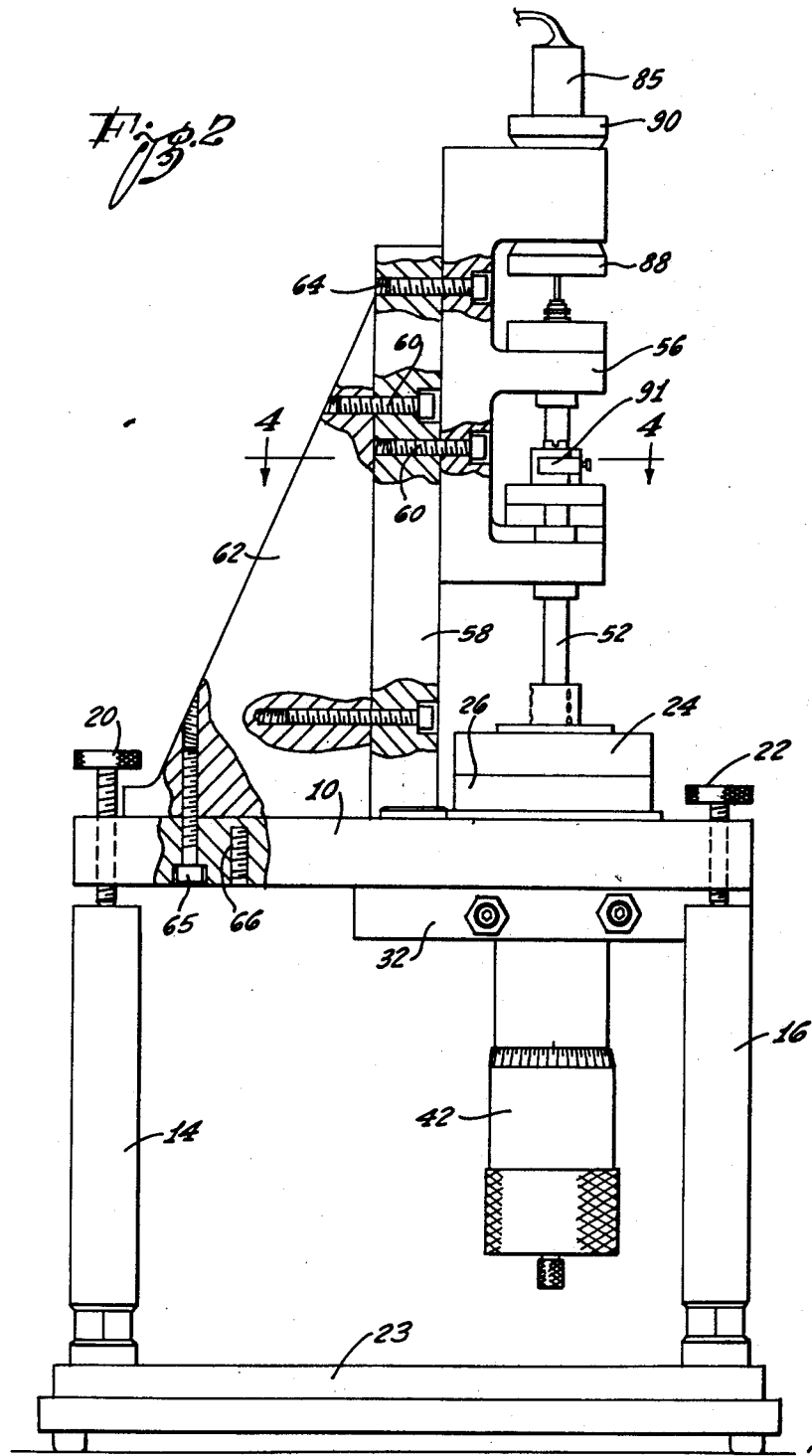

March 17, 1970  JAMES E. WEBB  3,500,677
ADMINISTRATOR OF THE NATIONAL AERONAUTICS
AND SPACE ADMINISTRATION
PARALLEL PLATE VISCOMETER
Filed Aug. 7, 1967  4 Sheets-Sheet 3
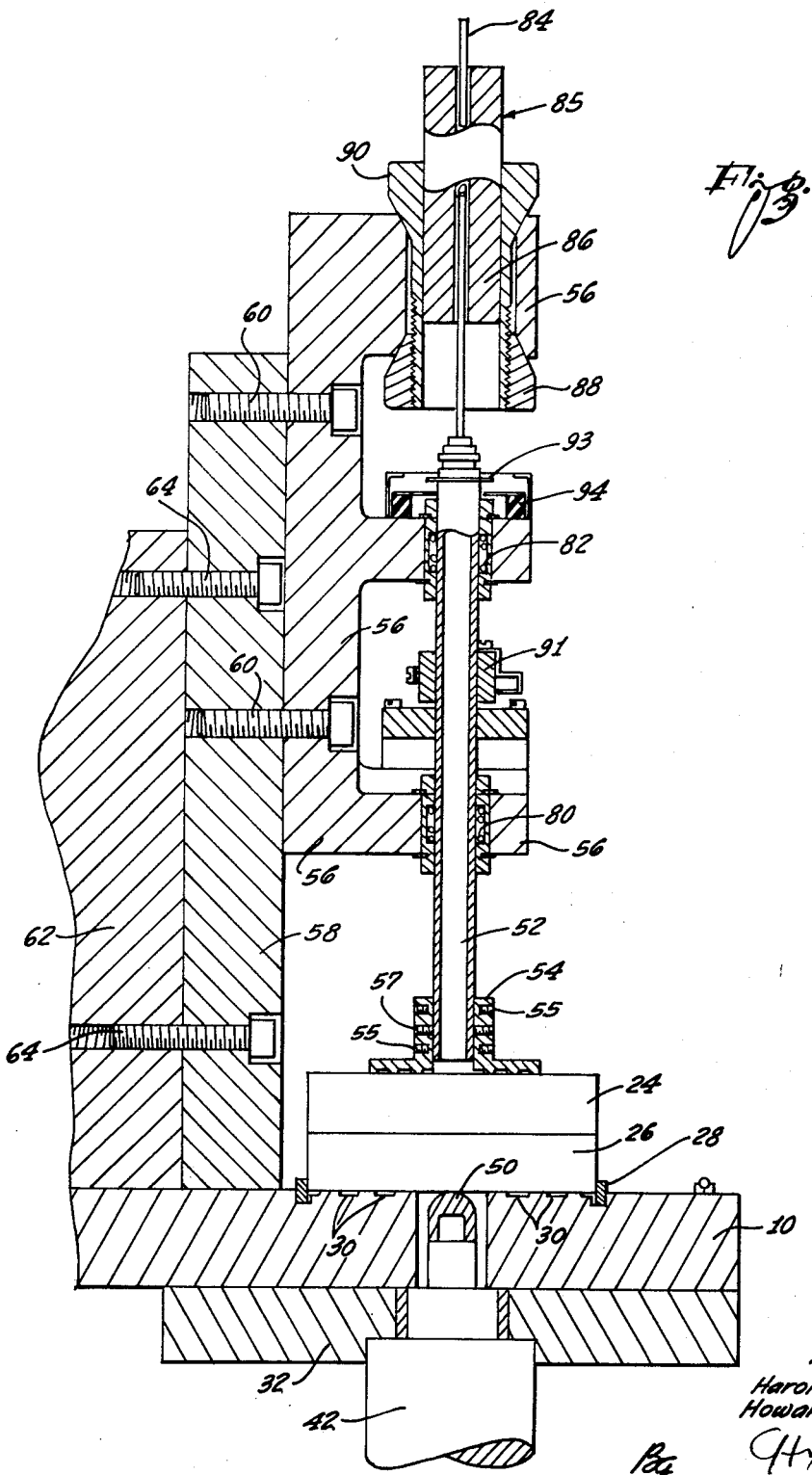
INVENTORS:
Harold H. Broyles
Howard F. Broyles
ATTORNEYS

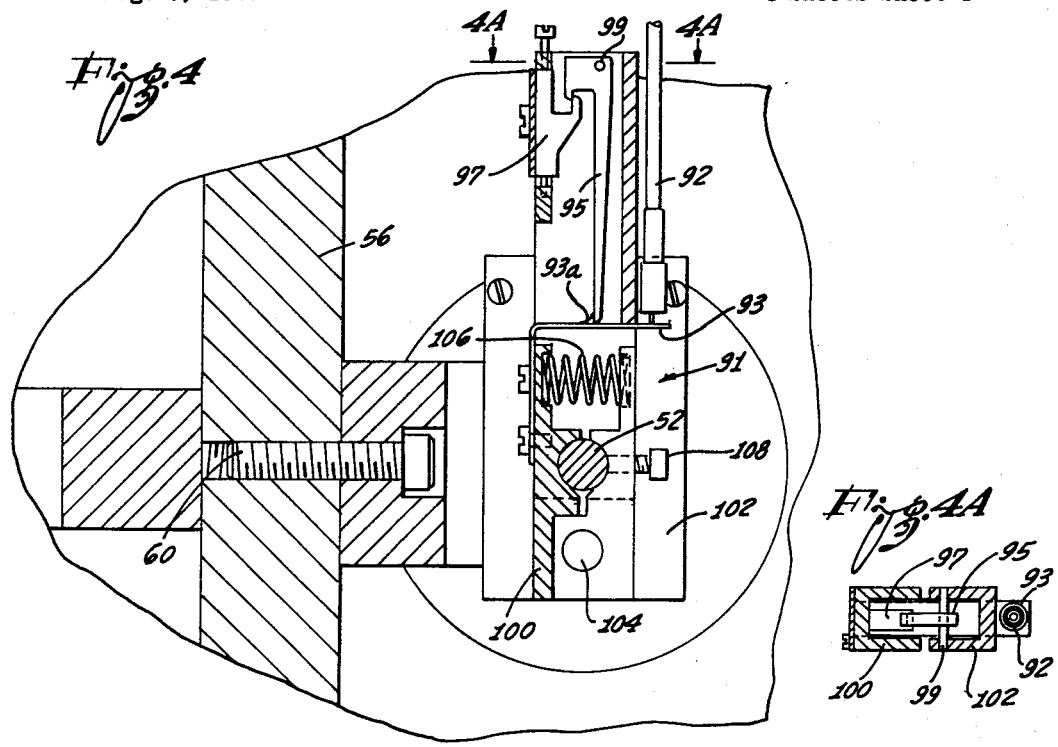
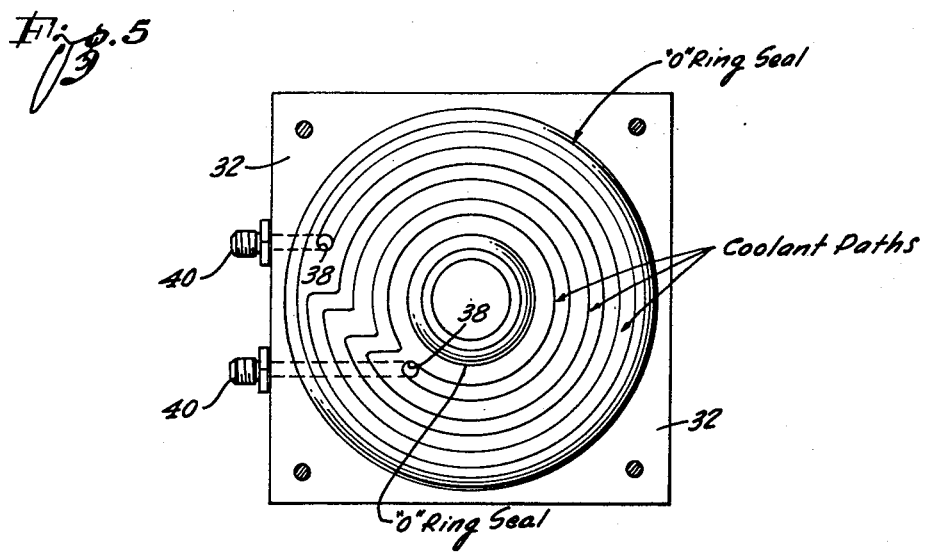

United States Patent Office

3,500,677
Patented Mar. 17, 1970

3,500,677
PARALLEL PLATE VISCOMETER
James E. Webb, Administrator of the National Aeronautics and Space Administration, with respect to an invention of Harold H. Broyles, Riverside, and Howard F. Broyles, La Crescenta, Calif.
Filed Aug. 7, 1967, Ser. No. 658,957
Int. Cl. G01n *11/10*
U.S. Cl. 73—57                                        10 Claims

ABSTRACT OF THE DISCLOSURE

An instrument capable of measuring the true shear viscosity of liquids and viscoelastic materials. The operation of the instrument is predicated upon the parallel plate method of viscosity measurement, however, optical flats are used instead of the usual parallel plates. The sample material whose viscosity is to be measured is placed between a pair of horizontal optical flats, the upper optical flat is adjusted until it is touching the sample and is then released. The rate of fall of the upper plate as it reduces the height of the sample material to a particular value is recorded, for example, by a suitable recorder coupled to a linear displacement transducer. The absolute viscosity of the sample is then determined by computing a simple formula.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Instruments and methods for measuring the viscosity of a gas or liquid are well known. However, prior known instruments and methods, for the most part, involve rather cumbersome formulas which cannot produce satisfactory results either quickly or without the expenditure of considerable effort.

For example, a principal method used for determining viscosity involves measuring the rate of fall under gravity of a sphere in the fluid whose viscosity is being measured. In determining viscosity by such a known method, and in accordance with Stokes' Law, viscosity is given by the formula:

$$\eta = \frac{2gr^2(\rho - \rho l)}{9V}$$

where:

$\eta$ is absolute viscosity
$r$ is radius of the sphere
$\rho$ is the density of the sphere
$\rho l$ is the density of the liquid
$V$ is the rate of fall or rise of the sphere Other methods involving, for example, capillary tubes, apply the Poiseville equations to the measurement of viscosity. Similarly, rotating cylinders and oscillating disc methods have been used in the past for measuring viscosity. In addition, the viscosity of a liquid or gas may be measured in accordance with prior art procedures by the utilization of the liquid or gas as a damping means for an oscillating cylinder.

The prior art methods outlined above are used for determining viscosity on an "absolute" basis. Other prior art methods and instruments using a "relative" approach have also been used. For example, an instrument for measuring viscosity on a relative basis is first calibrated by the use of a fluid of known viscosity, and the effect of the unknown fluid on the instrument is compared with that of the known fluid in order to determine the viscosity of the unknown fluid. However, even the relative types of prior art instruments are complex, and often do not produce desired accuracy.

The apparatus of the present invention is advantageous in that it offers a simple and direct means for accurately measuring the viscosity of the fluid under test, this being achieved by means of a relatively simple and inexpensive instrument. Moreover, the instrument may be easily and accurately used for quickly providing a precise indication of the viscosity of minute quantities of test fluids and slurries.

The operation of the instrument of the invention is based on the parallel plate method of measuring viscosity. The parallel plate method of measuring viscosity is in turn predicated upon the "imperfect solid" theory. That is, the yielding of the liquid sample to shear stress, such as is exerted by the parallel plates of the viscometer as they deform the sample between them, may be considered to be equivalent to the creep of crystalline solids at high temperatures. The rate of creep for a given stress depends upon the yielding of the crystalline structure along grain boundaries. The possibility of extending the imperfect solid theory to liquids depends upon the existence of clusters of liquid molecules in the liquid sample corresponding to the crystal grains in the crystalline solid.

It should be noted, however, that the sample under test should be relatively insensitive to the rate of shear. That is, it should not be markedly thixotropic. This is because inherently the flow rate of the sample being deformed between the two plates of the viscometer increases from approximately zero at its central portion to a maximum velocity at its outer periphery. Moreover, this effect becomes more pronounced as the ratio between sample height and sample diameter decreases.

However, if the sample is thixotropic the incipient error due to the variations in rate of shear can be compensated at a given point height or for a reasonable height range by substituting a meniscus for one of the parallel plates to cause uniform flow of the sample from its center to its periphery, with the meniscus changing with height of sample to maintain the uniform flow.

SUMMARY OF THE INVENTION

The apparatus of the invention includes a first horizontal plate in the form of an optical flat which may be adjusted to a desired elevation and which supports the sample whose viscosity is to be measured. The instrument also includes a second horizontal plate, also in the form of an optical flat, which is positioned coaxially above the first plate in parallel relationship therewith. The second plate can be moved vertically up from the first plate, and it can be latched at any desired elevation.

An optical flat is a disc of high grade quartz glass approximately ¾ inch thick; having at least one side ground and polished with a total surface deviation in flatness usually not exceeding 0.000002 inch and with a surface quality of 5 microfinish or less.

A measured amount of the sample material to be tested is placed on the lower optical flat by means of a calibrated syringe or, for example, by removing the lower optical flat and placing a known weight of the material thereon. The upper optical flat is then moved down until it is just touching the sample, and it is latched in that position. The upper flat is then released and allowed to fall, compressing the sample between it and the lower flat. A linear displacement transducer indicates the rate of fall of the upper flat as it compresses the sample under test, and this parameter, together with others, are computed in accordance with a simple formula for deriving the absolute viscosity of the sample material.

The novel features that are considered characteristic of his invention are set forth with particularity in the appended claims. The invention itself both as to its organization and method of operation, as well as additional objects and advantages thereof, will best be understood from the following description when read in connection with the accompanying drawings.

BRIEF DESCRIPTION OF THE DRAWINGS

FIGURE 2 is an elevational view of the instrument turned 90° with respect to the view of FIGURE 1;

FIGURE 3 is a side section of a portion of the instrument;

FIGURE 4 is a section taken substantially along the line 4—4 of FIGURE 2, and showing particularly a latching mechanism which is included in the instrument;

FIGURE 4A is a cross-section taken along the line 4A—4A of FIGURE 4; and

FIGURE 5 is a section taken substantially along the line 5—5 of FIGURE 1, and showing the manner in which heating or cooling elements may be included in the instrument so as to maintain the sample at any selected temperature.

DESCRIPTION OF THE ILLUSTRATED EMBODIMENT

Figure 1:
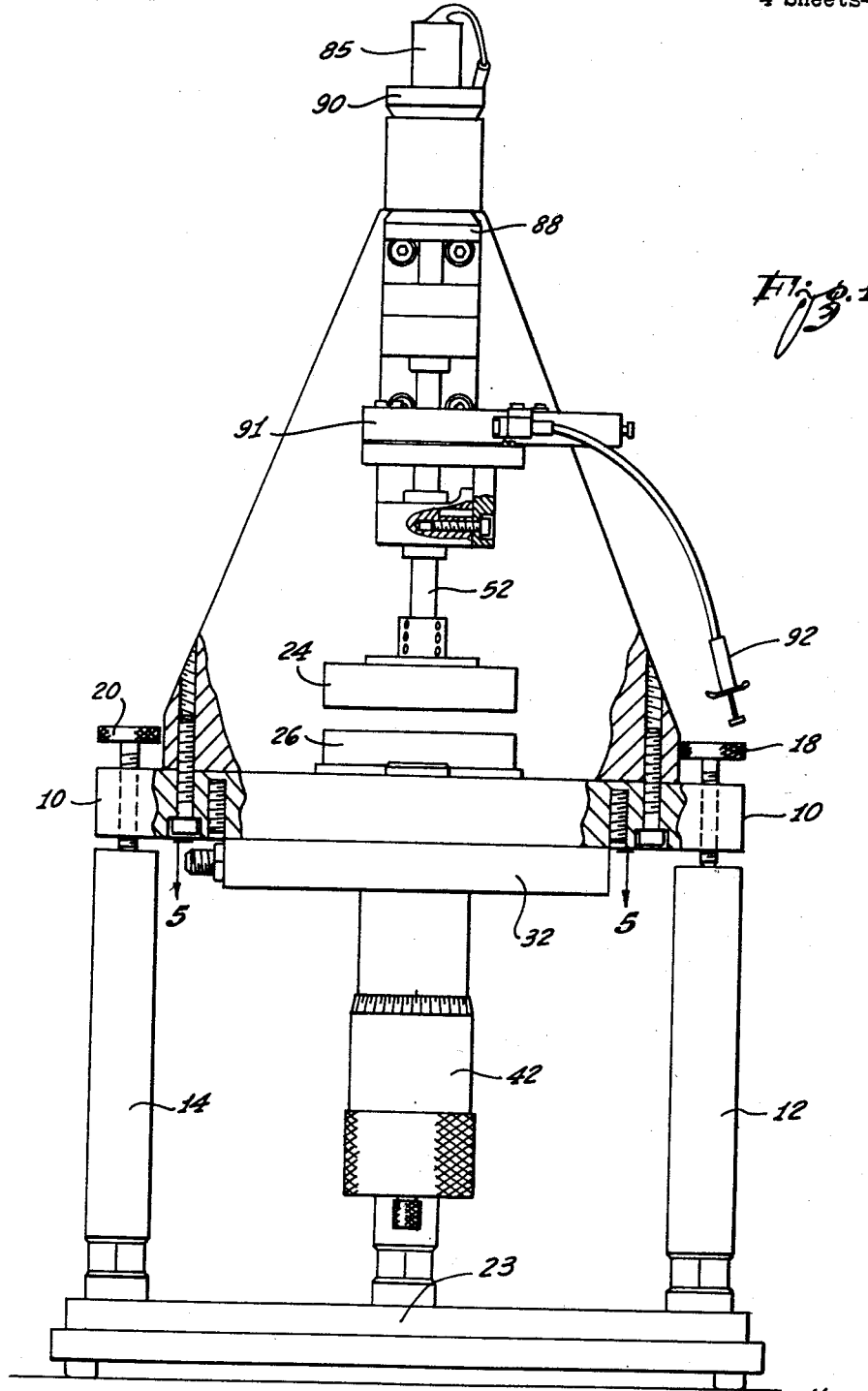
FIGURE 1 is an elevational view of one embodiment of the viscometer instrument of the invention, partially in section to reveal certain of the components of the assembly.

Referring now to the drawings, the illustrated embodiment of the viscometer of the present invention includes a horizontal leveling, mounting plate 10. The leveling plate 10 is supported, for example, on three support studs 12, 14 and 16 by corresponding leveling screws 18, 20 and 22. The leveling screws are threaded through the leveling plate 10 and they extend into shallow tapered bores in the upper surfaces of the respective studs. The studs, in turn, are supported on a base 23.

The illustrated instrument includes a pair of optical flats designated 24 and 26. These optical flats, as indicated above, are discs of high grade quartz glass approximately ¾ inch thick which have mating sides polished to a high degree of flatness. The mating sides of the discs preferably are capable of mating accurately to a two-color fringe tolerance over 360° of rotation.

The lower optical flat 26 is supported on the leveling plate 10 in a removable retainer ring 28. Concentric annular relief channels 30 are provided in the leveling plate 10 under the flat 26 for reducing any fluid surface tension which may exist between the flat and the leveling plate. Attached to the underside of the leveling plate 10 is a micrometer plate 32. The micrometer plate 32, as best shown in FIGURE 5, has channels 38 therein which receive, for example, a heating or a coolant fluid through fittings 40. The tempertaure of the fluid may be precisely maintained, so that the leveling plate 10 and optical flat 26, together with the supported sample material, may be established at a predetermined temperature and maintained at the desired predetermined temperature.

A depth type micrometer head 42 is mounted at the center of the micrometer plate 32 and extends through the plate. The screw of the micrometer with protective end cap 50 moves within a bore in the leveling plate 10. The micrometer end cap can be raised or lowered by precisely defined amounts by turning the barrel of the micrometer 42. The lower optical flat 26 rests on the end cap 50, and is raised or lowered thereby while maintaining its flatness over 360° with respect to the upper optical flat 24.

The upper optical flat 24 is mounted on the lower end of a vertical shaft 52 directly above the optical flat 26 and in concentric relationship with the lower optical flat. The upper optical flat 24 is mounted on the shaft 52 by means of a hub 54, which includes a series of strain screws 55 and set screws 57 which can accurately adjust the flat 24 into precise alignment with the shaft 52.

The vertical shaft 52 is slidable in a bracket 56 for linear movement along a vertical axis, so that the upper optical flat 24 may be moved up from or down towards the lower optical flat 26. The bracket 56 is mounted in a bracket 58 by means of screws 60, and the latter bracket is in turn supported by a bracket 62 and is attached thereto by means of screws 64. The bracket 62 is supported on the leveling plate 10 by screws such as the screw 65 and by strain deflection screws 66. The screws permit precise adjustment of the brackets, so that the movement of the optical flat 24 with respect to the optical flat 26 may be accurately aligned.

As shown in FIGURE 3, the vertical shaft 52 is mounted in linear ball bearing bushings 80 and 82 which, in turn, are mounted in the bracket 56. The shaft is slidable in these bearing bushings. In order to increase the accuracy of the instrument, the linear ball bearing bushings 80 and 82 may be replaced by respective air bearings so as to reduce bearing force essentially to zero.

The upper end of the shaft 52 is coupled to a slug 84 of a linear displacement transducer 85. The slug 84 moves in a coil assembly 86 and causes the coil to generate a voltage when the slug moves within the coil. The movement of the slug 84 within the coil assembly 86 corresponds to any movement of the shaft 52 along its vertical path. The linear displacement transducer assembly is mounted within the bracket 56 in bushings 88 and 90, as best shown in FIGURE 3 of the drawings.

A frictional latch mechanism 91 holds the shaft 52 in any position along its vertical path. The latch may be released by means of a mechanism as shown in FIGURE 4, which may be controlled by means of a latch release manual control mechanism 92, as shown in FIGURES 1 and 4. Therefore, the upper optical flat 24 may be moved up and away from the lower optical flat 26 and held by the latch mechanism 91 at any position displaced above the lower flat. At the desired time the control 92 may be actuated to release the latch mechanism 91 and thereby cause the upper optical flat to move down towards the lower optical flat.

A rubber cushion stop 94 (FIGURE 3) is provided, and the stop is engaged by a collar 93 for preventing the upper flat 24 from moving down against the lower flat 26 at a high rate of speed, so as thereby to provide protection for the optical flats.

As shown in FIGURES 4 and 4A, the shaft 52 passes through two jaws of the latch mechanism 91, these being designated 100 and 102. The jaw 100 and the jaw 102 are hinged to the base of the latch mechanism by a hinge shoulder bolt 104. The jaws are normally latched closed by means of a latch 95 so as to frictionally engage the shaft 52 and hold the shaft against movement along its vertical path. A coil spring 106 tends to separate the jaws 100 and 102 to release the shaft 52. A set screw 108 is provided which bears against the shaft when the latch mechanism 91 is closed (as illustrated in FIGURE 4), and which can be adjusted to control the pressure of the latch mechanism against the shaft.

The latch mechanism 91 is held in the closed, or latched, position shown in FIGURE 4, by the latch 95. The latch 95 is pivoted to the jaw 102 by a pivot pin 99; and it bears against a projection 93a on a leaf spring 93 at one end, and against an adjustable retainer 97 at its other end. The retainer 97 is mounted on the jaw 100 of the latch mechanism. The end of the latch release control 92 bears against the leaf spring 93, and when that control is actuated, the leaf spring is forced down in a clockwise direction in FIGURE 4, thereby releasing latch 95. This causes the latch 95 to pivot about the pin 99 so that its other end is freed from the retainer 97. This permits the spring 106 of the latch mecahnism 91 to open the jaws 100, 102, and thereby release the shaft 52.

To operate the instrument, the optical flats 24 and 26 are first brought together and mated to two color fringes. Thereafter the micrometer head 42 is turned until movement of the pen of a usual strip chart recorder which may be coupled to the transducer 85 is noticed. The micrometer is then backed off until the pen no longer moves. This establishes the zero point. The range, which is the number of thousandths of an inch that the particular sample is expected to vary in thickness during the test, is then set for full scale deflection of the recorder pen. As an example, 0.100 inch for full scale deflection of the recorder pen. As an example, 0.100 inch for full scale deflection is used in many instances. Conversion accuracy is better than ±.001 inch. In this manner, the recorder thereby is set to measure and record any movement of the upper optical flat 24. The upper optical flat 24 is then moved manually upward and out of the way of the lower optical flat, and the shaft 52 thereafter is latched by the latching mechanism 91.

A measured volume of the material whose viscosity is to be measured is then placed on the lower optical flat 26. As noted previously, the same material may be placed on the lower optical flat 26 by means of a calibrated syringe, for example, so that the volume of the material thereby is accurately determined. The latch mechanism 91 is then released by means of the latch release control 92, and the upper flat 24 is manually brought down into contact with the sample material. The latching mecahnism 91 thereafter is set and thus the viscosity measurement thereafter may be made.

The volume of the material to be tested and the total weight of the upper flat assembly are entered into a computer which is associated with the instrument. The initial height of the sample ($h_o$) is automatically entered in the computer by means of the transducer 85. The instantaneous solution to the viscosity formula such as set forth hereinbelow is computed by the computer upon the release of the latch 92. Releasing the latch 92 also starts the time base of the recorder. Points thereafter are plotted automatically for tests of different duration and an extrapolation to one second is made for obtaining viscosity value.

The general formula is solved, for example, by the computer from the output of the linear transducer 85, and from the aforesaid data relating to the volume of the sample material and the force of the upper flat assembly. The start time for obtaining viscosity measurement is set by releasing the upper optical flat assembly latch 91 and this thereby, as indicated above, automatically initiates the time base of the read-out recorder.

It is important that the volume of the sample material be chosen so that its diameter at all times is less than the diameter of the optical flats 24 and 26. The basic equation followed by the instrument of the invention is for example:

$$Ft/3hV = (1/h - 1/h_o) + V/8\pi(1/h^4 - 1/h_o^4) \quad (2)$$

where:

$F$ = force applied to the sample
$t$ = time during which the height of the sample is measured
$h$ = height of the sample at the end of test
$h_o$ = initial height of the sample
$V$ = sample volume The viscosity measurement may be obtained, for example, from a log-log plot of the right hand side of Equation 2 as a function of time. Should the viscosity be calculated from the behavior as short times, the curve should be extrapolated at one second, where the intercept is log $F/3hV$.

As indicated hereinabove, the viscometer of the invention consists of a base 23, a vertical mounting plate 58 and a horizontal mounting plate 10. The two optical flats 24 and 26, capable of being mated to two color fringes, are used in the viscometer of the invention, in lieu of the usual parallel plates. The mounting devices incorporate leveling screws 18, 20 and 22, and strain deflection screws such as the screw 66, that afford parallelism accuracy between the two optical flats 24 and 26 over 360° rotation.

The lower optical flat 26 is mounted above the micrometer head 42, resting normally over a machined recess in the horizontal mounting plate 10, and the upper flat 24 is fixed to the lower end of the shaft 52 which extends upward to the linear displacement transducer 85. The shaft 52 is equipped with a simple friction latch 91 which permits the shaft to be retained in any position along its vertical path of travel, and subsequently released. A collar 93 and rubber bumper 94 prevents the optical flats from severe contact which could damage the flats.

The apparatus of the invention is advantageous in that it permits the application of heat to the sample under test by controlling the temperature of the fluid passing through the conduits described in conjunction with FIGURE 5. This capability provides for greater measurement accurracy. The weight of the upper optical flat 24 and the shaft structure provides a force which can be calculated precisely. This force acts to shear the sample outwardly from the center of the optical flats. In addition to determining the absolute viscosity of the sample material, the rate of creep of the sample material can be determined easily and rapidly by the apparatus of the invention.

Instead of relying on the free fall of the upper optical flat, as is the case with the instrument described above, a pressure plenum chamber may be provided which has the capability of balancing or augmenting the weight of the optical flat 24, for example, from a negative balance of approximately 1¼ pounds at sea level, to approximately 15 pounds positive preload.

Since the diameter of the shaft is determined with a high degree of accuracy and the positive of vacuum pressure applied in the plenum chamber may be precisely regulated by standard methods, the effective weight of the dynamic mass may be accurately controlled in a continuous manner within the range noted.

The invention provides, therefore, an improved viscometer instrument which may be used for providing a quick and accurate determination of absolute viscosity of liquids and viscoelastic materials.

It is understood that modifications may be made in the arrangements as shown without departing from the true spirit of the invention. Therefore, all such modifications and equivalents are deemed to fall within the scope of the invention.

What is claimed is:

1. A viscometer for the measurement of shear viscosity of a sample of liquids, viscoelastic materials, and the like, including:

a first optical flat having a surface on which a sample to be measured is placed;

a second optical flat having a surface with an area substantially equal to the surface area of said first optical flat; said sample having a smaller surface area than the surface area of either said first or said second optical flat;

means for mounting said optical flats with their said surfaces in facing relationship and for relative movement therebetween, and linear transducer means for measuring the extent of relative movement between said relatively moving optical flats.

2. The viscometer defined in claim 1 in which said optical flats are mated to two color fringes.

3. A viscometer for the measurement of shear viscosity of a sample of liquids, viscoelastic materials, and the like, including:

a first optical flat having a surface on which a sample to be measured is placed;

a second optical flat having a surface equal in area to the surface of said first optical flat; the surface area of said first or said second optical flat exceeding the surface area of said sample;

support means for mounting said first optical flat in a horizontal plane;

a slider structure;

means for mounting said second optical flat on said slider structure in a horizontal plane and with its surface directly over the surface of said first optical flat on which a sample is placed;

releasable means coupled to said slider structure for holding said second flat clear of said first flat and for releasing said second flat for movement toward said first flat; and linear transducer means for measuring the extent of movement by said first flat toward said second flat.

4. The viscometer defined in claim 3 in which said optical flats each have a disc-like configuration.

5. The viscometer defined in claim 3 in which said optical flats are mated to two color fringes.

6. The viscometer defined in claim 3 and which includes a micrometer mounted on said support means and engaging said first flat for controlling the elevation thereof.

7. The viscometer defined in claim 3, in which said slider structure includes a vertical shaft affixed to said second flat and linearly movable along a vertical path, and said releasable means includes a frictional latch mechanism engaging said shaft to hold said shaft at any desired position along said vertical path.

8. The viscometer defined in claim 3 and which includes a plate supported on said support means, and conduits in said plate for carrying a fluid to maintain said first flat at a predetermined desired temperature.

9. The viscometer defined in claim 7 and which includes precision means for adjusting the alignment between the upper optical flat and said vertical shaft.

10. The viscometer defined in claim 3 and which includes adjustable leveling means for said support means.

References Cited

UNITED STATES PATENTS

| | | | |
|---|---|---|---|
| 989,822 | 4/1911 | Strasburger | 73—57 |
| 1,748,512 | 2/1930 | Knopf | 73—57 |
| 1,748,513 | 2/1930 | Knopf | 73—57 |
| 2,638,779 | 5/1953 | Wilson | 73—57 |
| 2,913,898 | 11/1959 | O'Halloran et al. | 73—57 |
| 3,371,522 | 3/1968 | Norcross | 73—57 |

LOUIS R. PRINCE, Primary Examiner

J. W. ROSKOS, Assistant Examiner